(12) United States Patent
Nguyen et al.

(10) Patent No.: US 10,026,139 B2
(45) Date of Patent: Jul. 17, 2018

(54) METHOD OF DETECTING AND EXTRACTING A WATERMARK

(71) Applicant: DOLBY LABORATORIES LICENSING CORPORATION, San Francisco, CA (US)

(72) Inventors: Philippe Nguyen, Rennes (FR); Camille Rizko, Burbank, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/033,040

(22) PCT Filed: Oct. 30, 2014

(86) PCT No.: PCT/FR2014/052768
§ 371 (c)(1),
(2) Date: Apr. 28, 2016

(87) PCT Pub. No.: WO2015/063426
PCT Pub. Date: May 7, 2015

(65) Prior Publication Data
US 2016/0284039 A1   Sep. 29, 2016

(30) Foreign Application Priority Data

Oct. 31, 2013 (FR) ..................... 13 60656

(51) Int. Cl.
*G06K 9/00* (2006.01)
*G06T 1/00* (2006.01)
(Continued)

(52) U.S. Cl.
CPC ............ *G06T 1/0071* (2013.01); *G06T 1/005* (2013.01); *G10L 19/018* (2013.01);
(Continued)

(58) Field of Classification Search
USPC ....................................................... 382/100
See application file for complete search history.

(56) References Cited

U.S. PATENT DOCUMENTS

| 6,728,408 B1 * | 4/2004 | Echizen ............... G06T 1/0021 |
| | | 382/100 |
| 7,058,979 B1 | 6/2006 | Baudry et al. |
| 2004/0042636 A1 | 3/2004 | Oh |

FOREIGN PATENT DOCUMENTS

JP    2000 151968 A    5/2000

OTHER PUBLICATIONS

Kundur et al., "Diversity and Attack Characterization for Improved Robust Watermarking," IEEE Transactions on Signal Processing, Oct. 1, 2001, pp. 2383-2396, vol. 49, No. 10, IEEE Service Center, New York, NY, US.*

(Continued)

*Primary Examiner* — Gregory F Cunningham

(57) ABSTRACT

A method of detecting and extracting a watermark (digital watermarking) in a digital signal. The watermark is composed by the repetition of elementary components of a load to be transmitted. At least one repetition of an elementary component in the digital signal is detected. At least one quality attribute is assigned to each repetition of at least one elementary component. The repetitions of an elementary component are sorted according to a function of the quality attributes of these repetitions. Certain repetitions, dubbed individualities, of an elementary component are selected. The selected repetitions are fused.

13 Claims, 1 Drawing Sheet

(51) Int. Cl.
*H04N 1/32* (2006.01)
*G10L 19/018* (2013.01)
(52) U.S. Cl.
CPC . *H04N 1/32293* (2013.01); *G06T 2201/0053* (2013.01); *G06T 2201/0065* (2013.01); *G06T 2201/0202* (2013.01)

(56) References Cited

OTHER PUBLICATIONS

Aggrwal et al., An Efficient Watermarking Algorithm to Improve Payload and Robustness without Affecting Image Perceptual Quality, Journal of Computing Apr. 2010, Retrieved from Internet on Jul. 19, 2017. Retrieved from: <https://pdfs.semanticscholar.org/b432/ca13a87047179f71efcc280cf99d49883fed.pdf>.*

Baudry et al., "Analyses of error correction strategies for typical communication channels in watermarking," Signal Processing, Jun. 1, 2001, pp. 1239-1250, vol. 81, No. 6, Elsevier Science Publishers B.V., Amsterdam, NL.

Fan et al., "Capacity and Reliability of Digital Watermarking," Proc. IEEE International Conference on e-commerce Technology, Jul. 9, 2004.

Kim et al., "A Reliability Engineering Approach to Digital Watermark Evaluation," J. Electronic Imaging, Dec. 2006, vol. 15, No. 4.

* cited by examiner

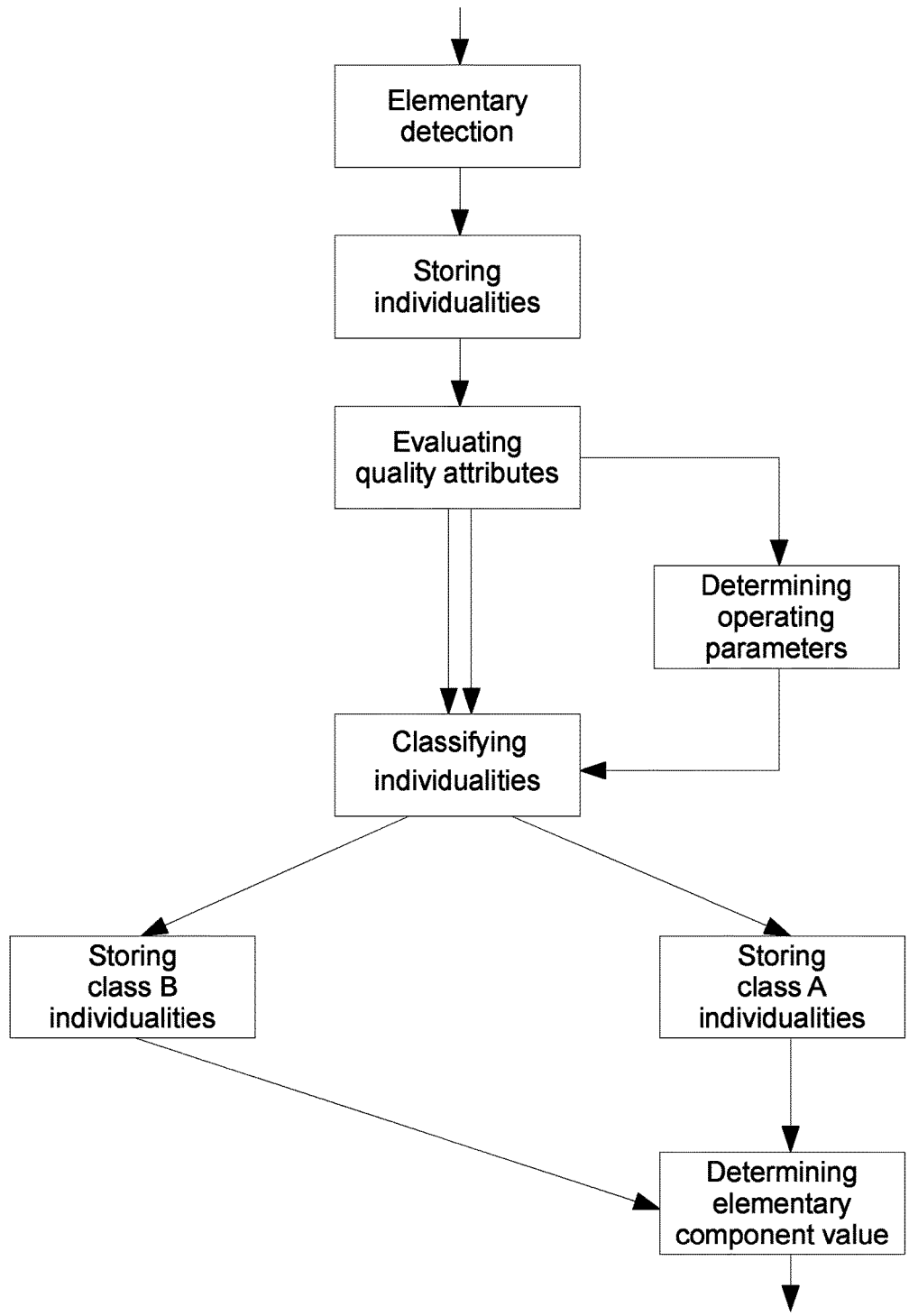

METHOD OF DETECTING AND EXTRACTING A WATERMARK

RELATED APPLICATIONS

This application is a § 371 application from PCT/FR2014/052768 filed Oct. 30, 2014, which claims priority from French Patent Application No. 13 60656 filed Oct. 31, 2013, each of which is incorporated herein by reference in its entirety.

FIELD OF THE INVENTION

The present invention is aimed at an image processing method, comprising a step of increasing the sensitivity of a watermark detector.

It pertains to the field of methods of processing images, and especially of signing these images (steganography and watermarking).

BACKGROUND OF THE INVENTION

The desire to attach a signature to an image or a sequence of images is related to the problem of the illegal copying of these images. Such a need for signing images in a manner hidden in the image has been known for decades.

The signing of an image (so-called steganography technique) generally consists of the insertion, within the pixels of the image, of modifications of the value of certain parameters (their luminance for example) of some of these pixels, as a function of a message to be inserted. Diverse signature techniques have been developed over the years, for example so as to increase the robustness thereof faced with successive copies of an image, and these techniques are very widespread today.

Image signature methods are naturally associated with methods for detecting the existence of a signature in the image, and for reading the message buried in the image.

The process of inserting and then recovering (also called the extraction process) a watermark is generally considered, rightly, to be a communication method.

A signal, the watermark, carrying an item of information to be concealed, the load (or "payload"), is mingled with another signal, called the cover signal. From the standpoint of the communication method defined above, the cover signal is noise, that is to say a phenomenon which disturbs the communication.

To alleviate error-causing noise, the designer is led to introduce a considerable redundancy into the transmission of messages. When the error rates are high, the simplest form of redundancy, which is the repeating of the messages, is the most efficacious (see for example in this regard the document "Analyses of error correction strategies for typical communication channels in watermarking", Séverine Baudry, Jean-François Delaigle, Bülent Sankur, Benoît Macq, Henri Maître: Signal Processing 81(6): 1239-1250 (2001)). In these situations, performance is considered to be the ratio: computational load/correction capacity.

During the reconstruction of the initial message (or watermark extraction operation), a method conventionally used to exploit repetition is majority voting also called majority decoding. Each repetition of a message element "votes" for the value that it reckons to be the initial value before the disturbance of the communication by noise.

The repetition of the message consists in transmitting each of the component symbols, or bits in the binary case, of the message several times (several tens, hundreds or thousands of times).

Majority decoding, or majority voting, consists in retaining as symbol value at the decoding output, the value observed most often at reception, reception being moreover disturbed by noise.

This procedure is examined, for example, in the article "Analyses of error correction strategies for typical communication channels in watermarking", Séverine Baudry, Jean-François Delaigle, Bülent Sankur, Benoît Macq, Henri Maître: Signal Processing 81(6): 1239-1250 (2001)).

The method may, however, be considered to be suboptimal, since individuals that are strongly disturbed by noise have the same weight in the final decision as those that have been spared.

The present invention is aimed at remedying this drawback especially.

OBJECT AND SUMMARY OF THE INVENTION

To this effect, the invention is aimed firstly at a method of detecting and extracting a watermark (digital watermarking) in a digital signal, said watermark being composed by the repetition of elementary components of a load to be transmitted, said method comprising:
- a step of detecting at least one repetition of an elementary component in the digital signal,
- a step of assigning at least one quality attribute to each repetition of at least one elementary component, and
- a step of sorting the repetitions of an elementary component according to a function of the quality attributes of these repetitions, and
- a step of selecting certain repetitions (also dubbed individualities in the subsequent description) of an elementary component, this provision making it possible to discard repetitions of overly low quality, and
- a step of merging the selected repetitions.

Thus, the image processing method such as set forth allows an increase in the sensitivity of a watermark detector, in a method of detecting and extracting a digital watermark using redundancy.

More generally, the invention is aimed at information communication in a highly disturbing environment (also dubbed a highly noisy environment). A typical case of these communication situations is content watermarking.

The method set forth allows message (here a watermark) extraction in a highly noisy environment.

The invention proposes a decoding method having a more considerable correction capacity than majority voting, such as cited above, thereby making it possible to increase the sensitivity of equipment for detecting and extracting digital watermarks.

The method applies to the reconstruction of a message that has been repeated a certain number of times. Its use makes it possible to transform the highly erroneous repetitions into a single more reliable message, with a more considerable error tolerance capacity than the conventional majority voting or decoding schemes.

In diverse modes of implementation, optionally used jointly according to all the technically achievable combinations:
- the quality attribute of each repetition of an elementary component is the reliability of this repetition,
- a quality attribute in the form of a scalar value is evaluated for each repetition of an elementary component.
- the repetitions are classified by decreasing attribute value.
- the repetitions having attributes of overly low quality are discarded from the final process of determining the value to be retained for the elementary component.

the elementary components are binary.

alternatively, the elementary components are real quantities, that is to say values in the set of real numbers.

the selection of the individualities is performed by way of a classifying according to the individual reliabilities, and then by grouping into two classes; the class A of winning individualities and a class B of minor individualities. In this case, more particularly, the boundary between the domains of the winning individualities and of the minor individualities is evaluated by a statistical computation on the total or partial population of the repetitions of elementary components.

the merger of the selected individualities arising from the repetition of one and the same elementary component is carried out by summation. By selected individualities is meant the elements of the class A hereinabove, also called "winning individualities".

the merger of the selected individualities arising from the repetition of one and the same elementary component is carried out by weighted summation; the weighting being determined by a function of the quality of each individuality.

According to diverse modes of implementation, the digital signal is representative:

of a still image, of a sequence of moving images, of a sound sequence.

The invention is aimed in a second aspect at a digital watermark decoding device, characterized in that it comprises means of implementing a method such as set forth.

BRIEF DESCRIPTION OF THE DRAWINGS

The characteristics and advantages of the invention will be better appreciated by virtue of the description which follows, which description sets forth the characteristics of the invention through a nonlimiting exemplary application.

The description is based on the appended FIGURE which represents:

FIG. 1: a flowchart of the steps of the method.

DETAILED DESCRIPTION OF AN EMBODIMENT OF THE INVENTION

For the subsequent description, the following terms are defined:

A set of repetitions of the elementary components forming a message (or load) to be inserted within a cover signal, here a digital image, is dubbed a watermark. The data sample resulting from the detection and from the reading in a zone of the image of a repetition of an elementary component of the watermark is dubbed individuality.

As has been seen, the realization of a system for inserting a watermark into a cover signal (digital watermarking of images) requires the fine tuning of two categories of methods:

1) those which make it possible to insert a message into an image or another file (for example digital audio);

2) those which make it possible to exploit the marks, stated otherwise to detect and determine the elements of the message buried in these images.

It is clear that the method of inserting a watermark into an image or a sequence of images (or another file, for example digital audio) is, a priori, intended to be used in a systematic manner on all the images generated by a user. On the other hand, the method detecting and reading a message buried in an image is intended to be used much more rarely, typically when a doubt exists as regards the real provenance of an image.

Here, images is intended to mean either single images or sequences of images, for example video sequences. More generally, the method remains usable without significant modification for the processing of coded messages within digital audio files.

The invention proposes a particular method of organizing the detection and extraction of the watermark values constituting the buried message.

In the present exemplary embodiment, the invention is implemented in the form of a software application executed on a computer, for example of PC type.

This software application receives as input one or more digital or digitized images liable to contain a watermark to be detected and read. The software application provides as output the content of the message detected if such a message has been detected.

It is assumed here that the images have been coded (that is to say that a message has been inserted thereinto) with a method using a redundancy of the message to be inserted into the image. It is assumed that the message has repeated a certain number of times in the image and/or the sequence of images to ensure the transmission thereof through a disturbing environment, especially a highly noisy one The case is considered where the buried message is made up of a sequence of elements forming part of an alphabet A. These may especially but not limitingly entail binary values or real or complex numbers, or a combination of these values.

In a step 101, the signal to be analyzed (watermarked signal) undergoes an elementary detection which produces the individualities, that is to say samples of data arising from the repetition of an elementary component of the watermark.

In a step 102, the individualities are temporarily stored to facilitate their use by the following processing steps.

In a step 103, characteristics of quality of each individuality, said characteristics also being called quality attributes, are evaluated.

In a step 104, statistics are performed on the quality attributes so as to determine dynamically if necessary the operating parameters of step 105.

In a step 105 the individualities are sorted into at least two classes.

In steps 106 and 107, the individualities are temporarily stored to facilitate their use by the following processing.

In a step 108, the individualities associated with one and the same elementary component of the message are used to take a decision about the value of the elementary component (value on the previously cited alphabet A).

In an implementation variant, the cover signal is an image (or a sequence of images) and the image, once coded, comprises a plurality of watermarked blocks disposed at diverse places in the image. In this case, the method comprises, for example, steps such as listed hereinbelow.

In a step, the location of a watermarked block is determined in the image.

In a subsequent step, samples of data (individuality of a repetition within the sense defined above) are extracted from the image. These steps of determining and extracting an individuality are carried out by techniques known per se to the person skilled in the art.

In a subsequent step, a quality attribute is assigned to each individuality extracted. A quality attribute (scalar value) is evaluated for each individuality (repetition of a message element). The individualities (repetitions) are classified by decreasing attribute value. The individualities having attributes of overly low quality are discarded from the final process of determining the value to be retained for the elementary component of the message.

In a subsequent step, there is performed a sorting of the individualities according to this quality attribute and the statistics performed on the population of the values taken by the present attributes.

The selection of the individualities is performed by way of a classifying according to the individual reliabilities and then by the grouping into at least two classes; the class A of the winning samples and a class B of the minor samples.

In this case, more particularly, the boundary between the domains is evaluated by a statistical computation on the populations consisting of the values of individual quality.

The merger of the individualities arising from the repetition of one and the same elementary component is carried out by summation.

The merger of the individualities arising from the repetition of one and the same elementary component is carried out by weighted summation, the weighting being determined by a function of the quality of each sample.

ADVANTAGES

The watermark detection method, such as set forth, applies to the reconstruction of a message that has been repeated a certain number of times. Its use makes it possible to transform the repetitions, highly erroneous, into a single more reliable message, with a more considerable error tolerance capacity than the conventional majority voting or decoding schemes.

The invention claimed is:

1. A method of detecting and extracting a watermark, a digital watermarking, in a digital signal, said watermark being composed by a repetition of elementary components, said method comprising the steps of:
   detecting at least one repetition of an elementary component in the digital signal to provide a data sample dubbed an individuality of said elementary component, said at least one repetition being a binary bit;
   determining at least one quality attribute of each repetition of at least one elementary component, said at least one quality attribute being a bit error rate, a reliable repetition having a lower bit rate than an erroneous repetition;
   classifying the repetitions of said elementary component according to said at least one quality attribute of these repetitions to identify erroneous repetitions;
   selecting the repetitions, dubbed individualities, of said elementary component according to a classification of the repetitions to discard the erroneous repetitions and to keep reliable repetitions of said elementary component; and
   merging the reliable repetitions by a weighted summation, a weight of each reliable repetition being determined as a function of said at least one quality attribute of said each reliable repetition, to detect and extract the watermark in the digital signal.

2. The method as claimed in claim 1, wherein the quality attribute of each repetition of said elementary component is the reliability of this repetition.

3. The method as claimed in claim 1, further comprising the step of classifying the repetitions of one and the same elementary component by decreasing bit error rate.

4. The method as claimed in claim 1, further comprising the step of discarding the erroneous repetitions from a final process of determining a value to be retained for the elementary component.

5. The method as claimed in claim 1, wherein the elementary components are binary.

6. The method as claimed in claim 1, wherein the elementary components are real quantities, values of the elementary components are in a set of real numbers.

7. The method as claimed in claim 1, further comprising a step of grouping the classification of the repetitions into two classes: a class of winning individualities and a class of minor individualities.

8. The method as claimed in claim 7, further comprising the step of evaluating a boundary between domains of the winning individualities and of the minor individualities by a statistical computation on a total or partial population of the repetitions of the elementary components.

9. The method as claimed in claim 7 wherein a merger of the winning individualities arising from the repetition of one and the same elementary component is carried out by summation.

10. The method as claimed in claim 1, wherein the digital signal is representative of a still image.

11. The method as claimed in claim 1, wherein the digital signal is representative of a sequence of moving images.

12. The method as claimed in claim 1, wherein the digital signal is representative of a sound sequence.

13. A digital watermark decoding device for detecting and extracting a watermark, a digital watermarking, in a digital signal, said watermark being composed by a repetition of elementary components, the digital watermark decoding device detects at least one repetition of an elementary component in the digital signal to provide a data sample dubbed an individuality of said elementary component; determines at least one quality attribute of each repetition of at least one elementary component, said at least one quality attribute being a bit error rate, a reliable repetition having a lower bit rate than an erroneous repetition; classifies the repetitions of said elementary component according to said at least one quality attribute of these repetitions to identify erroneous repetitions; selects the repetitions, dubbed individualities, of said elementary component according to a classification of the repetitions to discard the erroneous repetitions and to keep reliable repetitions of said elementary component; and merges the reliable repetitions by a weighted summation, a weight of each reliable repetition being determined as a function of said at least one quality attribute of said each reliable repetition, to detect and extract the watermark in the digital signal.

* * * * *